United States Patent [19]
Lund et al.

[11] 4,454,543
[45] Jun. 12, 1984

[54] DYNAMIC VIDEO SCRAMBLING

[75] Inventors: John A. Lund, McHenry Shores; David L. Richardson, Arlington Heights, both of Ill.; Graham S. Stubbs, Poway, Calif.

[73] Assignee: Oak Industries Inc., Rancho Bernardo, Calif.

[21] Appl. No.: 318,756

[22] Filed: Nov. 6, 1981

[51] Int. Cl.³ ............................................. H04N 7/16
[52] U.S. Cl. ................................... 358/118; 358/123; 358/124
[58] Field of Search ........................ 358/118, 124, 123

[56] References Cited

U.S. PATENT DOCUMENTS

| 3,729,576 | 4/1973 | Court | 358/124 |
| 4,024,575 | 5/1977 | Harney et al. | 358/118 |
| 4,064,536 | 12/1977 | Saeki et al. | 358/118 |
| 4,216,500 | 8/1980 | St. Louis | 358/118 |
| 4,308,556 | 12/1981 | Osaka | 358/124 |
| 4,340,906 | 7/1982 | Toonder et al. | 358/124 |

FOREIGN PATENT DOCUMENTS 841627 7/1960 United Kingdom ............... 358/124

Primary Examiner—S. C. Buczinski
Attorney, Agent, or Firm—Kinzer, Plyer, Dorn & McEachran

[57] ABSTRACT

A means for coding and decoding video signals by the application of one of a plurality of available scrambling signals includes means for comparing the brightness level during a predetermined time period of the video signal with the brightness level of the video signal over the succeeding predetermined time period. There are means for changing from one scrambling signal to another if the difference between brightness levels in successive predetermined time periods exceeds a given value.

4 Claims, 3 Drawing Figures

DYNAMIC VIDEO SCRAMBLING

SUMMARY OF THE INVENTION

The present invention relates to the coding and decoding of video signals and in particular provides a method and apparatus for coding video signals in response to changes in the content or scene of the picture carried by the video signal.

A primary purpose of this invention is a coding system of the type described in which a plurality of periodic signals are available for scrambling the video signal and in which the scrambling signal is changed in response to differences in the video signal brightness level from one predetermined time period to the next.

Another purpose is a video signal coding and decoding process in which the instantaneous brightness level of a video signal is sampled during a predetermined time period and compared with the average value of the signal over that time period. The thus formed signal representative of the brightness level of the video signal for a predetermined time period is compared with similar signals for the succeeding and preceding time periods. If the difference in brightness level between successive time periods exceeds a predetermined value, indicative of a scene change in the program carried by the video signal, the specific scrambling signal used to code the video signal is changed.

Another purpose is a method of coding video signals in which a plurality of scrambling sinewaves each of which is a multiple of the video signal horizontal line frequency are available for use as the coding medium.

Another purpose is a method of coding and decoding video signals in which a plurality of sinewaves of different frequency are available to code a video signal and in which the decoder includes means for automatically detecting which of said plurality of periodic waveforms are used in the coding process and causes a corresponding change in the decoding mode.

Another purpose is a coding and decoding process of the type described in which sinewaves having a frequency which is a multiple of horizontal line frequency of the video signal are used to code the video signal and in which the decoder automatically detects which of said coding frequencies is utilized and applies a corresponding decoding signal to the incoming video signal.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to subscription television or the coding and decoding of video signals and has application in cable television systems, over the air pay television, commonly called subscription television, and in coded satellite video transmissions. The invention will be specifically described in connection with the coding and decoding of video signals for a cable system.

The invention utilizes an electrical circuit for detecting a change in the scene or a change in the picture carried by the video signal for effecting a change in the specific coding applied to the video signal. Stated another way when there is change in the video signal content, the coding mode changes. Information as to a change in coding mode may be transmitted along with the video signal to the individual subscriber, or as described herein, the decoder may include means for automatically detecting a change in the coding mode. The specific means for detecting a change in the content of the picture carried by the video signal is illustrated in copending application Ser. No. 149,708 filed May 14, 1980 and assigned to the assignee of the present application.

In the present application coding is provided by the application of sinewaves in the manner described in U.S. Pat. No. 4,024,575. The patent describes the use of a coding sinewave having a frequency of 15.75 KHz. The present application utilizes a coding sinewave of that frequency plus a coding sinewave of 31 KHz with the change from one coding frequency to another being made when there is a change in the content of the picture carried by the video signal. Although only two coding frequencies are described, it should be understood that the invention contemplates a plurality of more than two different coding signals, each of which may be a multiple of the horizontal line frequency and each of which may be sinewaves, but could be otherwise.

Figure 1:
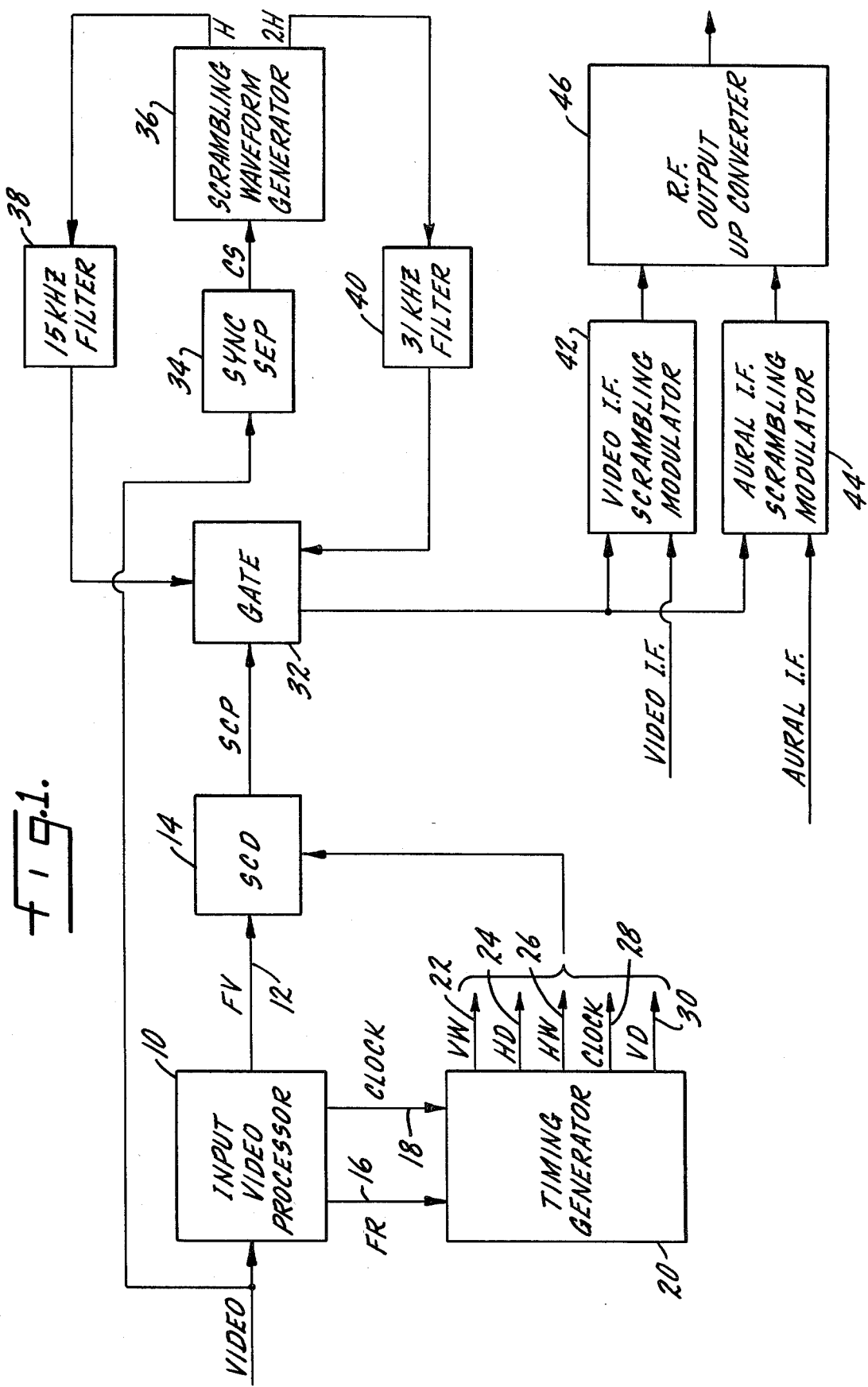
FIG. 1 is a block diagram illustrating the coding apparatus described herein.

In FIG. 1 the video signal, at baseband frequency, is applied to an input video processor 10. The processor 10 has a number of outputs, one of which, a filtered video signal (FV) indicated on line 12, is connected to a scene change detector 14 illustrated in FIG. 2. The input video processor also has an output designated frame reference (FR), on line 16 and a clock signal on line 18, which clock signal may have a frequency of 4.0909 MHz. The frame reference signal and the clock signal provide the input for a timing generator 20 which will provide a number of output signals, all synchronized by its two inputs. The output signals are designated vertical window (VW), on line 22, horizontal drive (HD) on line 24, horizontal window (HW) on line 26, a clock signal having a frequency of 4 MHz, and indicated on line 28, and a vertical drive signal (VD) on line 30. All of these outputs are connected to scene change detector 14.

The vertical drive signal will be a positive pulse beginning at the first line of the vertical interval and extending to the 9th line of that interval. The vertical window is a positive pulse beginning at line 46 and extending until line 238 of the vertical interval. The horizontal drive and horizontal window signals are each positively directed pulses. The horizontal drive signal begins approximately 2.2 microseconds after the beginning of a horizontal line and ends approximately 8.8 microseconds into a horizontal line. The horizontal window begins approximately 14.8 microseconds into a horizontal line and ends approximately 62 microseconds into a horizontal line.

Figure 2:
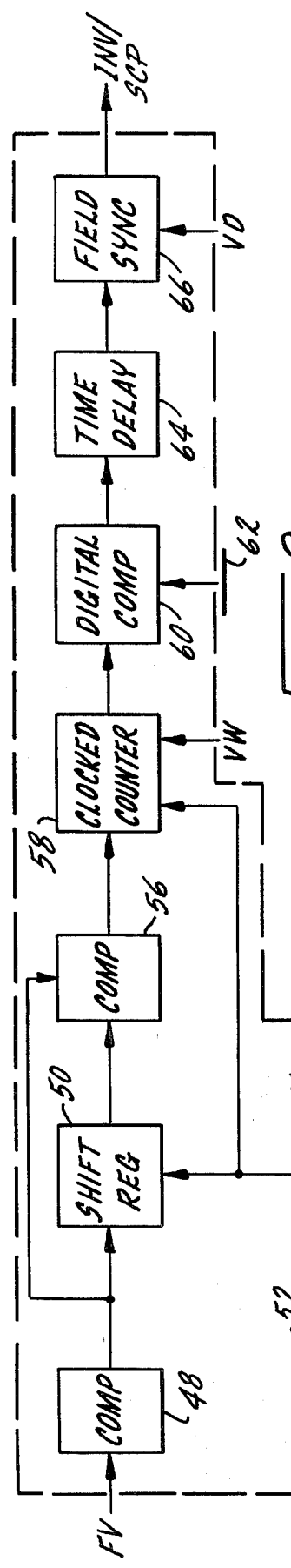
FIG. 2 is a block diagram illustrating the method for detecting a change in the scene carried by the video signal, and, FIG. 3 is a block diagram of the decoder.

The output from scene change detector 14 which will be described in detail in connection with FIG. 2 is connected to a gate 32. The input video signal which is connected to the input video processor is also connected to a sync separator 34 whose output, which is composite sync (CS), is connected to a scrambling waveform generator 36. Generator 36 will provide two outputs, one at line frequency, 15.75 KHz and the other at twice line frequency or approximately 31 KHz. One output from generator 36 will thus be connected to a 15 KHz filter 38 the output of which is connected to a gate 32 with the other output from scrambling waveform generator 36 being connected to a 31 KHz filter 40 whose output is also connected to gate 32.

The output from gate 32 which will be either a 15 KHz sinewave or a 31 KHz sinewave, depending upon the output from scene change detector 14 is connected to a video IF scrambling modulator 42 and an aural IF scrambling modulator 44. Modulators 42 and 44 also have an input of the video signal at IF frequency and the aural signal at IF frequency as described in more detail in the above mentioned U.S. Pat. No. 4,024,575. Scrambling is accomplished at the IF frequency level and thus both the video and the aural signals at IF frequency are applied to scrambling modulators 42 and 44 and the scrambling sinewave, at either 15 KHz or 31 KHz are applied thereto. As described in the above mentioned patent, the depth of modulation of the scrambling signal applied to the aural IF signal is somewhat greater than that applied to the video IF signal. The output from video modulators 42 and 44 is applied to an output of RF output converter 46 which provides the video and aural signals at a specific carrier frequency for a designated television channel.

Scene change detector 14 has an input of filtered video which is essentially bandwidth limited monochrome video which provides the input for a voltage comparator 48. Analog comparator 48 compares the instantaneous brightness of the video signal with the average brightness over a period of time, for example, three frames. The output from comparator 48 is sampled at a rate of 2,048 samples per field and these samples are stored in shift register 50. In fact, the binary video at the output of comparator 48 is sampled at a rate of 32 samples in one out of every three lines over a period of 192 lines each field.

This sampling process is controlled by timing generator 20. A divide by three circuit 52 is clocked by the horizontal drive and reset by the vertical window. The vertical window in addition to resetting the divide by three circuit, thus insuring the same starting point in every frame, also prevents counting and blocks the output of this circuit during the vertical interval. Thus, divide by three circuit 52 produces a pulse during every third line except during the vertical interval. A divide by six circuit 54 is driven by the 4 MHz clock and reset by divide by three circuit 52 and the horizontal window. Accordingly, the divide by six circuit 54 produces output pulses only every third line and only during the horizontal window. Since the horizontal window lasts for 192 clock pulses and divide by six circuit 54 produces one output pulse for every six clock pulses, there are 32 sample pulses every third line except during the vertical interval.

A digital comparator 56 is connected to the output of shift register 50 and compares the output binary number from shift register 50 with the output binary number from comparator 48. Thus the brightness level of one field is compared with the brightness level of the preceding field at each of the same locations in the field. The output from digital comparator 56 which will be either high or low, depending on whether the brightness levels are the same or different, is connected to a clocked counter 58. Counter 58 receives the output from divide circuits 52 and 54 and thus is clocked at the same rate as shift register 50. Clocked counter 58 will count pulses at the described sample rate when the comparator output from circuit 56 is high indicating dissimilar inputs. Thus, whenever there is a difference in the brightness levels from one field to the next, that indication of a brightness change will be registered by clocked counter 58. The counter is reset by the vertical drive signal so that a new count begins for each field. Clocked counter 58 is connected to a digital comparator 60 which has a preset number, as provided by a series of manual switches diagrammatically indicated 62. Thus, the threshold for recognition of a scene change can be varied. The number from clocked counter 58, when it exceeds the number provided by preset switches 62 is indicative of a scene change as there have been a sufficient number of changes in the brightness level from one field to the next to indicate a scene change. The output from digital comparator 60 is a pulse indicating that in fact a scene change has taken place and this pulse is connected to a time delay 64. Time delay 64 may typically have a 3 second period and thus will not register a new scene change unless 3 seconds have elapsed. In this way, fast moving objects or the like will not trigger a change in coding mode. Time delay circuit 64 is connected to a field sync circuit 66 which is gated by the vertical drive signal from timing generator 20. Thus a scene change, which will cause a change in coding mode of the video signal as described, will only take place at the end of a field and such change in coding mode will not take place at a greater frequency than every three seconds. The scene change detector output of field sync 66 is connected to gate 32 as described above.

To summarize the operation of the coding system, as described herein the coding signal is either at 15 KHz or a 31 KHz sinewave. The coding signal could be otherwise and what is important is to provide a plurality of scrambling signals which are changed in accordance with a detected change in the brightness level of the video signal indicating a change in the picture portrayed by the video signal. The change in brightness level is detected or determined by the scene change detector as described and the threshold for determining when a particular change in scene has taken place may be varied. There can only be a change in coding mode at the end of a field or between fields. This is important as a change in coding mode may be visible to the viewer as the form of decoding residual visible on the television screen will vary with the type of coding signal. However, if the change in coding mode is concurrent with a change in the scene, the viewer will not notice a change in the residual decoding, if it is noticeable at all. Thus, the dynamic scrambling concept as disclosed herein changes the scrambling mode or the form of scrambling at a point in the video signal which makes it essentially unobservable to the normal television viewer.

Figure 3:
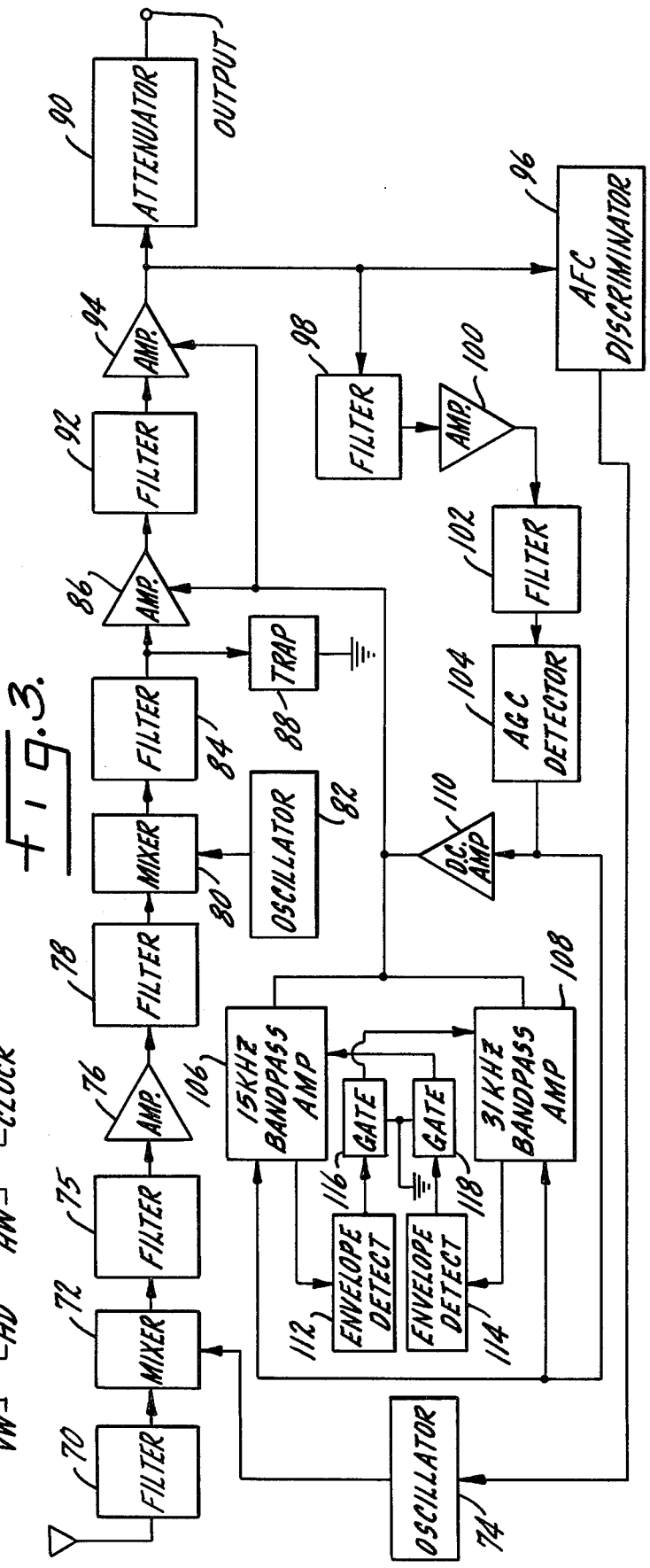

FIG. 3 illustrates a decoding apparatus and is specifically a cable television converter of the type illustrated in the above mentioned U.S. patent and U.S. Pat. No. 3,333,198. The incoming signal from a cable system passes through an input filter 70 which is connected to a first mixer 72. A variable oscillator 74 is connected to mixer 72.

The output from mixer 72 is directed to a filter 75 which in turn is connected to an amplifier 76. Amplifier 76 is connected to a second filter 78 and to a second mixer 80. A fixed local oscillator 82 is connected to mixer 80, with the output from the mixer being a television channel frequency normally unused in the particular area. Input filter 70 receives a wide spectrum of cable channels, as many as 35 to 56 are conventionally used in CATV systems. Variable oscillator 74 is used to select a particular channel desired by the subscriber, with oscillator 82 converting the selected channel to a predetermined VHF channel, again normally a channel not locally used in a broadcast channel in the area, but one which can be received on a conventional television receiver. Thus, all channels on the cable can be shown on a particular TV receiver and on a normally unused channel, for example channel 3.

The output from mixer 80 is connected to a filter 84 with the output from the filter being connected to an RF amplifier 86. A trap 88, normally used to remove the video signal of the next highest channel is connected between filter 84 and amplifier 86. An attenuator 90 is connected to amplifier 94 with the output from the attenuator being connected directly to the television receiver. If the particular channel chosen by operation of oscillator 74 is a nonsubscription channel, thus one with no scrambling superimposed, the television signal will be readily viewable at the TV receiver on the designated channel.

The output from amplifier 86 also passes through an output channel filter 92 with the output from filter 92 being connected to a second RF amplifier 94. Amplifiers 86 and 94 are the decoding or descrambling amplifiers as will appear hereinafter and as described in more detail in U.S. Pat. No. 4,024,575. An AFC discriminator 96 is connected to the output of amplifier 94 and is used to maintain frequency at the output of oscillator 74 as is conventional.

The decoding portion of the circuit includes an output channel audio carrier filter 98 with the output of the filter being connected to an RF amplifier 100. A second output channel audio carrier filter 102 is connected to amplifier 100 with the output from the filter being connected to an AGC detector 104. Detector 104 has its output connected to a DC amplifier 110 which provides a prescribed DC level for the decoding signal as will be described. The output of detector 104 is also connected to a pair of band pass amplifiers designated at 106 and 108, with amplifier 106 having a pass band around 15 KHz and amplifier 108 having a pass band around 31 KHz, the two scrambling frequencies in the described example. The outputs from amplifiers 106 and 108 are connected to amplifiers 86 and 94 and will provide a decoding signal at the DC level set by amplifier 110. Amplifiers 106 and 108 are each connected to envelope detectors 112 and 114 respectively with the outputs from the two envelope detectors being connected to gates 116 and 118 respectively. The output from gate 116, responsive to envelope detector 112 and band pass amplifier 106 is used to inhibit amplifier 108. In like manner, the output from gate 118 is responsive to envelope detector 114 and amplifier 108 and is used to inhibit amplifier 106.

Assuming that the scrambling signal has a frequency of 15.75 KHz, envelope detector 112 will detect that that is the frequency of the scrambling signal and thus its associated gate 116 will inhibit amplifier 108. The reverse is true if the scrambling signal has a frequency of 31 KHz. It is necessary to have the detector and gate circuits described, regardless of which scrambling frequency is utilized, since it is desired to have a single loop filter in operation to prevent unwanted loop noise and distortion which are excessive when two loop filters are operated simultaneously.

As described above the aural or audio carrier will have a greater depth of scrambling modulation than the video carrier. It is for this reason that the AGC detecting loop described utilizes the residual from the audio carrier, after decoding, as a means for providing the decoding signal. Details of this process are disclosed in U.S. Pat. No. 4,024,575.

Although the invention has been described in connection with the specific example of cable television and the specific example of two scrambling frequencies which are harmonically related to video signal horizontal line frequency, it could be otherwise. The concept of dynamic scrambling provides a means for changing the scrambling mode or the specific scrambling signal applied to the video signal, in accordance with changes in the video signal which cannot be readily predicted. A change in the scene carried by the video signal which is represented by a variation in the brightness level of the video signal is used to trigger the change from one coding mode to the other.

Whereas the preferred form of the invention has been shown and described herein, it should be understood that there may be many modifications, substitutions, and alterations thereto.

The embodiment of the invention in which an exclusive property or privilege is claimed are defined as follows:

1. Means for descrambling a video signal scrambled by the application of one of a plurality of available scrambling signals and whereby the scrambling signals are changed in accordance with changes in the brightness level of the video signal, including plural means for detecting, only from the scrambling applied to the video signal, which of the plurality of available scrambling signals is currently being used, said plural detecting means, each including a detector responsive to a scrambling signal different from any other available scrambling signals, and means connected to and responsive to said plurality of detectors for effecting a descrambling mode to descramble the video signal scrambled by the application of the detected scrambling signal.

2. The descrambling means of claim 1 further characterized in that said coding signals differ in frequency and each are multiples of the horizontal line frequency of the video signal.

3. The descrambler of claim 1 further characterized in that the coding signals are changed in response to a difference in brightness level between successive predetermined video signal time periods.

4. The descrambling means of claim 1 further characterized by a plurality of band pass amplifying means connected to said detectors, there being one band pass amplifying means for each scrambling signal, and gate means connected to said detectors and band pass amplifying means to provide a descrambling signal consistent with the particular scrambling signal used to scramble said video signal.

* * * * *